US011801650B2

(12) United States Patent
Zhou (10) Patent No.: US 11,801,650 B2
(45) Date of Patent: Oct. 31, 2023

(54) METHOD FOR MANUFACTURING BOWL AND GLASS BOWL

(71) Applicant: Qingbing Zhou, Guangdong (CN)

(72) Inventor: Qingbing Zhou, Guangdong (CN)

(*) Notice: Subject to any disclaimer, the term of this patent is extended or adjusted under 35 U.S.C. 154(b) by 240 days.

(21) Appl. No.: 17/325,462

(22) Filed: May 20, 2021

(65) Prior Publication Data

US 2022/0324189 A1 Oct. 13, 2022

(30) Foreign Application Priority Data

Apr. 7, 2021 (CN) .......................... 202110370125.3

(51) Int. Cl.
| | | |
|---|---|---|
| A47G 19/10 | (2006.01) |
| B29D 22/00 | (2006.01) |
| A47G 19/02 | (2006.01) |
| B29C 33/38 | (2006.01) |
| B29C 35/02 | (2006.01) |
| A47J 43/07 | (2006.01) |
| B29K 83/00 | (2006.01) |

(52) U.S. Cl.
CPC .......... *B29D 22/003* (2013.01); *A47G 19/02* (2013.01); *A47J 43/0727* (2013.01); *B29C 33/3842* (2013.01); *B29C 35/02* (2013.01); *A47G 19/10* (2013.01); *B29K 2083/00* (2013.01)

(58) Field of Classification Search
CPC ... A47J 43/0727; A47G 19/08; A47G 19/191; A47G 19/10; B29C 33/3842
See application file for complete search history.

(56) References Cited

U.S. PATENT DOCUMENTS

| | | | | | |
|---|---|---|---|---|---|
| 4,233,428 | A | * | 11/1980 | Endo ..................... | C09D 183/08 525/507 |
| 2006/0248851 | A1 | * | 11/2006 | Kishbaugh ............ | A47J 36/027 52/750 |
| 2013/0005844 | A1 | * | 1/2013 | Yeung ..................... | C09J 183/04 521/134 |
| 2019/0001656 | A1 | * | 1/2019 | Susnjara ................ | B33Y 40/00 |
| 2020/0260838 | A1 | * | 8/2020 | Samain ................ | A45D 40/30 |
| 2022/0168934 | A1 | * | 6/2022 | Shen ..................... | A47G 19/00 |

* cited by examiner

*Primary Examiner* — Scott W Dodds
(74) *Attorney, Agent, or Firm* — Gardner, Linn, Burkhart & Ondersma LLP (57) ABSTRACT

A method for manufacturing a bowl and a glass bowl are disclosed. A high borosilicate glass bowl is manufactured with high borosilicate glass, which has characteristics of high hardness, high light transmittance, high chemical stability, cold and hot shock resistance, and the like. A radian of a bottom is measured by a laser scanner, so that an accurate molding die can be manufactured by a numerical control machine tool. A solid rubber compound is mixed by a mixing mill, and then a vulcanizing agent and a silica gel masterbatch are added to obtain a silicone rubber raw material. The silicone rubber raw material is taken out according to a preset weight, then put together with the high borosilicate glass bowl into a molding vulcanizer. Vulcanization compression molding is performed to obtain a high borosilicate glass bowl with an anti-slip silica gel bottom.

5 Claims, 5 Drawing Sheets

FIG. 5

METHOD FOR MANUFACTURING BOWL AND GLASS BOWL

CROSS-REFERENCE TO RELATED APPLICATION

This application is filed on the basis of Chinese patent application No. 2021103701253 filed Apr. 7, 2021, and claims priority of the Chinese patent application, the entire contents of which are incorporated herein by reference.

TECHNICAL FIELD

The present disclosure relates to the field of bowls, and more particularly, to a method for manufacturing a bowl and a glass bowl.

BACKGROUND

With the continuous progress of society, there are more and more kinds of glass. The glass is not only transparent and clear, but also has high strength and hardness, thus being an indispensable material in daily production and life. The glass is also widely used in the field of bowls, so that glass bowls are manufactured. However, the glass bowls are easy to slip in situations such as being contacted with a table top, or being contacted with hands of a user.

SUMMARY

The present disclosure aims to solve at least one of the technical problems in the existing technology by providing a method for manufacturing a bowl, and a glass bowl. By using the method for manufacturing a bowl, a high borosilicate glass bowl with an anti-slip silica gel bottom can be manufactured. Force bearing by the glass bowl when held by a hand can be facilitated, so as to prevent the hand from slipping relative to the glass bowl. Meanwhile, a friction between a bottom portion of the glass bowl and a table top can be increased when the glass bowl is placed on the table top.

In a first aspect, an embodiment of the present disclosure provides a method for manufacturing a bowl, which includes:

manufacturing a high borosilicate glass bowl with high borosilicate glass;
measuring a radian of a silica gel coating position of a bottom of the high borosilicate glass bowl by a laser scanner;
manufacturing a molding die according to the measured radian;
coating glue for adhering silica gel on the silica gel coating position of the bottom of the high borosilicate glass bowl;
putting a solid rubber compound into a mixing mill to be mixed evenly, and then adding a vulcanizing agent and a silica gel masterbatch to obtain a silicone rubber raw material;
loading the molding die into a molding vulcanizer, and setting a mold temperature, a pressure, and a time;
taking out the silicone rubber raw material according to a preset weight, and putting the silicone rubber raw material with a preset weight on the silica gel coating position of the bottom of the high borosilicate glass bowl; and
putting the high borosilicate glass bowl and the silicone rubber raw material into the molding vulcanizer, and performing, by the molding vulcanizer, vulcanization compression molding on the silicone rubber raw material to obtain a high borosilicate glass bowl with an anti-slip silica gel bottom.

The method for manufacturing a bowl according to the embodiment of the present disclosure at least has the following beneficial effects. The high borosilicate glass bowl is manufactured with the high borosilicate glass, which has characteristics of high hardness, high light transmittance, high chemical stability, cold and hot shock resistance, and the like, and the radian of the bottom is measured by the laser scanner, so that the accurate molding die can be manufactured by the numerical control machine tool; the solid rubber compound is mixed by the mixing mill, the vulcanizing agent and the silica gel masterbatch are added to obtain the silicone rubber raw material, the silicone rubber raw material is taken out according to the preset weight, then the silicone rubber raw material with the preset weight is put together with the high borosilicate glass bowl into the molding vulcanizer, and vulcanization compression molding is performed to obtain the high borosilicate glass bowl with an anti-slip silica gel bottom. Before vulcanization compression molding, the glue is coated for adhering the silica gel on the silica gel coating position of the bottom of the high borosilicate glass bowl, which can improve an adhesive firmness of the anti-slip silica gel bottom.

In the above method for manufacturing a bowl, the high borosilicate glass bowl includes a side wall portion, an arc portion, and a flat bottom portion which are sequentially connected from top to bottom, and the silica gel coating position includes the flat bottom portion and the arc portion.

By coating the flat bottom portion and the arc portion with silica gel, the high borosilicate glass bowl can be protected in a wide range.

In the above method for manufacturing a bowl, the glue is prepared from an alcohol solvent and a silicon compound.

By using the glue, which is formed of the alcohol solvent, the silicon compound and some additives, for adhering silica gel and glass, an adhesive firmness between the silica gel and the high borosilicate glass bowl can be improved.

In the above method for manufacturing a bowl, an upper mold temperature of the molding vulcanizer is 150° C. to 220° C., and a lower mold temperature of the molding vulcanizer is 150° C. to 220° C.; the pressure of the molding vulcanizer is set to be 1 kpa to 15 kpa; and the time of the molding vulcanizer is set to be 30 seconds to 100 seconds.

Temperature, pressure, and time are three key factors in a vulcanization compression molding process, and a silica gel coating effect of the anti-slip silica gel bottom can be improved by setting corresponding parameters according to the above method.

In the above method for manufacturing a bowl, before coating the glue on the bottom of the high borosilicate glass bowl, the method further includes the following step of: applying a sand blasting process on the silica gel coating position of the bottom of the high borosilicate glass bowl.

Applying a sand blasting process on the silica gel coating position of the bottom of the high borosilicate glass bowl first can improve a roughness of the silica gel coating position, so that the silica gel is adhered to the high borosilicate glass bowl more firmly.

In the above method for manufacturing a bowl, the glue is coated on the silica gel coating position of the bottom of the high borosilicate glass bowl by brushing, soaking, or spraying.

In a second aspect, an embodiment of the present disclosure provides the glass bowl, which includes:

a glass bowl body made of high borosilicate glass, wherein the glass bowl body includes a side wall portion, an arc portion, and a flat bottom portion which are sequentially connected from top to bottom, and an upper end of the side wall portion is provided with an annular protrusion for bearing a force or anti-slipping; and a silica gel pad, which is arranged on a bottom portion of the glass bowl body, the silica gel pad is configured to coat the arc portion and the flat bottom portion, and a bottom portion of the silica gel pad is provided with a recess.

The glass bowl according to the embodiment of the present disclosure at least has the following beneficial effects. The glass bowl body is made of high borosilicate glass, and has characteristics of high hardness, high light transmittance, high chemical stability, cold and hot shock resistance, and the like. The annular protrusion is arranged at the upper end of the side wall portion, so that when a user holds or grasps the side wall of the glass bowl body with a hand, force bearing by the glass bowl can be facilitated or the hand can be prevented from slipping relative to the glass bowl body. The silica gel pad is arranged at the bottom portion of the glass bowl body, which can not only protect the bottom portion of the glass bowl body, but also reduce noise when the glass bowl body contacts with the table top, and can also increase the friction between the bottom portion of the glass bowl body and the table top, thus avoiding the glass bowl from sliding easily. By arranging the recess at the bottom portion of the silica gel pad, the cost of silica gel material can be saved on one hand, and a function similar to a sucker can be realized on the other hand, so that the glass bowl can be adsorbed on the table top, and the glass bowl is more stable when placed flat on the table top. In addition, when the user needs to use the glass bowl body to stir foods, the user often tilts the glass bowl body to make a bowl opening face the upper right direction, which is convenient for a right hand to extend into the bowl to stir the foods. The silica gel pad coats the arc portion of the glass bowl body, so that when the bowl body is tilted, a contact place between the bowl body and the table top is still coated by the silica gel pad, thus having functions of protection, shock absorption, and anti-slipping.

In the above glass bowl, the annular protrusion has a thickness greater than a thickness of the side wall portion, and the annular protrusion has an inner side flush with an inner side of the side wall portion.

The thickness of the annular protrusion is greater than that of the side wall portion, the inner side of the annular protrusion is flush with the inner side of the side wall portion, so that the annular protrusion protrudes from an outer side of the side wall portion, when the user holds the side wall portion of the glass bowl body with a hand, even if the hand is relatively slippery and may slip relative to the side wall portion, the hand will abut against the annular protrusion when slipping to a lower end of the annular protrusion, so that the hand will not slip further relative to the glass bowl body, and the user may not be worried about the glass bowl slipping from the hand. When the user grasps an upper end of the side wall portion of the glass bowl body with a hand, the annular protrusion may be used as a force bearing point of the hand to increase the force bearing capacity of the glass bowl body, so that the user can grasp the glass bowl more firmly.

In the above glass bowl, a chamfer is arranged at a corner of the annular protrusion.

By arranging the chamfer at the corner of the annular protrusion, contact between the hands and the annular protrusion can be softer and more comfortable, thus increasing use comfort of the user.

In the above glass bowl, the silica gel pad is provided with an arc transition surface at an edge of the silica gel pad.

By providing the arc transition surface at the edge of the silica gel pad, a smooth transition between the edge of the silica gel pad and the glass bowl body can be achieved.

Other features and advantages of the present disclosure will be set forth in the following description, and are partially obvious from the description, or are learned by practicing the present disclosure. The objectives and other advantages of the present disclosure may be implemented and obtained by the structure particularly pointed out in the description, claims and drawings.

BRIEF DESCRIPTION OF DRAWINGS

The accompanying drawings are provided to further understand the technical themes of the present disclosure and constitute a part of the description. The accompanying drawings are used together with the embodiments of the present disclosure to explain the technical themes of the present disclosure, but are not intended to limit the technical themes of the present disclosure.

The present disclosure is further described hereinafter with reference to the accompanying drawings and the embodiments, wherein.

DETAILED DESCRIPTION

This section will describe specific embodiments of the present disclosure in detail. Preferable embodiments of the present disclosure are shown in the accompanying drawings. The accompanying drawings are provided for the purpose of supplementing the written description with graphics, so that each technical feature and the entire technical theme of the present disclosure can be visually and figuratively understood by those having ordinary skill in the art, but they cannot be understood as limitation to the scope of protection of the present disclosure.

In the description of the present disclosure, the terms "first" and "second" if mentioned are used for the purpose of distinguishing the technical features only, and cannot be understood as indicating or implying relative importance, implicitly indicating the number of technical features indicated thereby, or implicitly indicating the order of technical features indicated thereby.

In the description of the present disclosure, the terms "provide", "install", "connect" and the like should be understood in a broad sense unless otherwise specifically defined. The specific meaning of the above terms in the present disclosure may be reasonably determined according to specific contents of the technical themes by those having ordinary skill in the art.

Embodiments of the present disclosure provide a method for manufacturing a bowl, and a glass bowl. Using the method for manufacturing a bowl, a high borosilicate glass bowl with an anti-slip silica gel bottom can be manufactured. Force bearing by the glass bowl when held by a hand can be facilitated, so as to prevent the hand from slipping relative to the glass bowl. Meanwhile, a friction between a bottom portion of the glass bowl and a table top can be increased when the glass bowl is placed on the table top.

The embodiments of the present disclosure are further described hereinafter with reference to the accompanying drawings.

Figure 1:
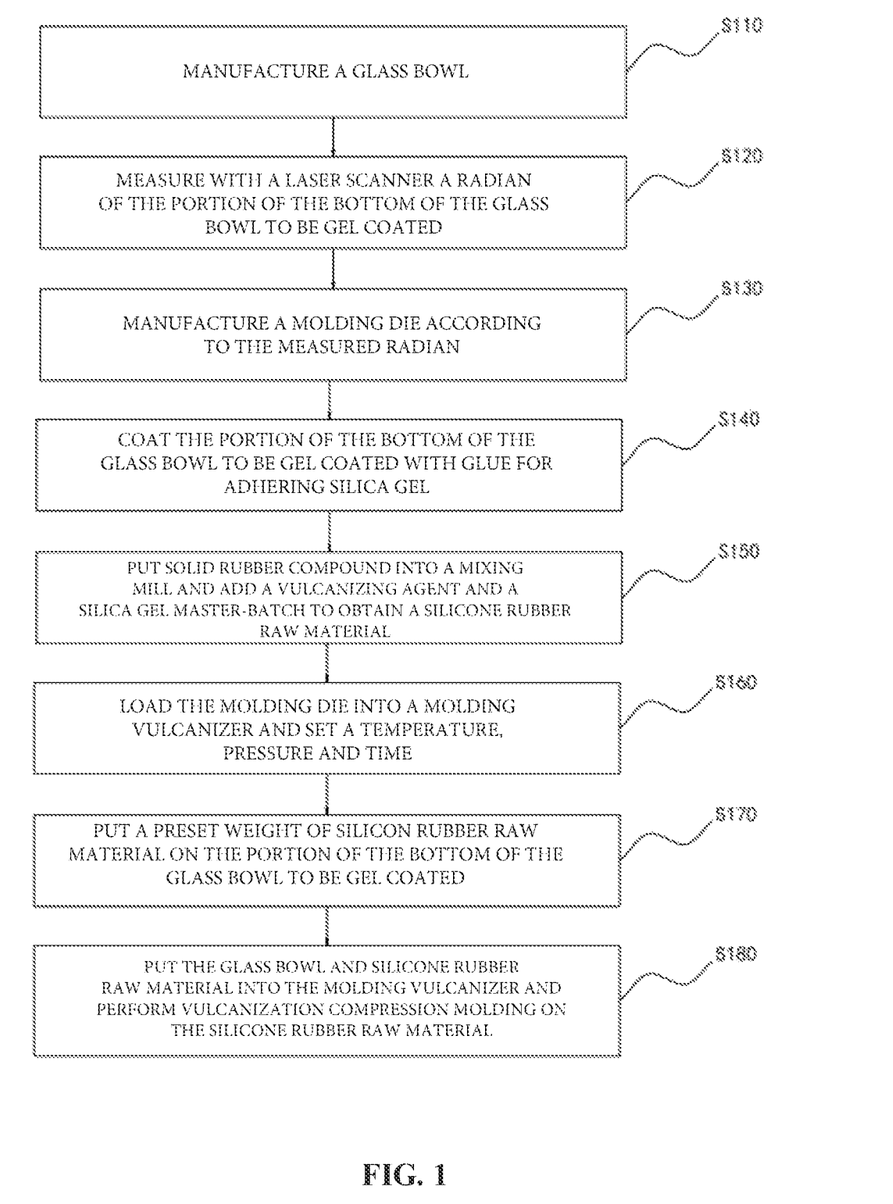
FIG. 1 is a flow chart of a method for manufacturing a bowl according to an embodiment of the present disclosure.

With reference to FIG. 1, according to an embodiment in a first aspect of the present disclosure a method for manufacturing a bowl is provided, which includes steps S110-S180.

At step S110, a high borosilicate glass bowl is manufactured with high borosilicate glass.

At step S120, a radian of a silica gel coating position of a bottom of the high borosilicate glass bowl is measured by a laser scanner.

At step S130, a molding die is manufactured according to the measured radian.

At step S140, glue is coated for adhering silica gel on the silica gel coating position of the bottom of the high borosilicate glass bowl.

At step S150, a solid rubber compound is put into a mixing mill to be mixed evenly, and then a vulcanizing agent and a silica gel masterbatch are added to obtain a silicone rubber raw material.

At step S160, the molding die is loaded into a molding vulcanizer, and a mold temperature, a pressure, and a time are set.

At step S170, the silicone rubber raw material with a preset weight is taken out and put on the silica gel coating position of the bottom of the high borosilicate glass bowl.

At step S180, the high borosilicate glass bowl and the silicone rubber raw material are put into the molding vulcanizer, and the molding vulcanizer performs vulcanization compression molding on the silicone rubber raw material to obtain a high borosilicate glass bowl with an anti-slip silica gel bottom.

In the method for manufacturing a bowl according to an embodiment of the present disclosure, the high borosilicate glass bowl is manufactured with the high borosilicate glass, which has characteristics of high hardness, high light transmittance, high chemical stability, cold and hot shock resistance, and the like, and the radian of a bowl bottom is measured by the laser scanner, so that the accurate molding die can be manufactured by the numerical control machine tool. The solid rubber compound is mixed by the mixing mill, the vulcanizing agent and the silica gel masterbatch are added to obtain the silicone rubber raw material, the silicone rubber raw material is taken out according to a preset weight, then the silicone rubber raw material with the preset weight is put together with the high borosilicate glass bowl into the molding vulcanizer, and vulcanization compression molding is performed to obtain the high borosilicate glass bowl with an anti-slip silica gel bottom. Before vulcanization compression molding, the glue is coated for adhering the silica gel on the silica gel coating position of the bottom of the high borosilicate glass bowl, which can improve an adhesive firmness of the anti-slip silica gel bottom.

A thickness of the anti-slip silica gel bottom at the bottom of the high borosilicate glass bowl is generally set between 1 mm and 3 mm, and the preset weight in step S170 is calculated according to the thickness and an area of the anti-slip silica gel bottom.

It should be noted that, in the mixing mill, the rubber raw material in step S150 generally forms a sheet with a thickness ranging from 4 mm to 8 mm, with thin films at both sides to keep the rubber raw material clean.

Figure 2:
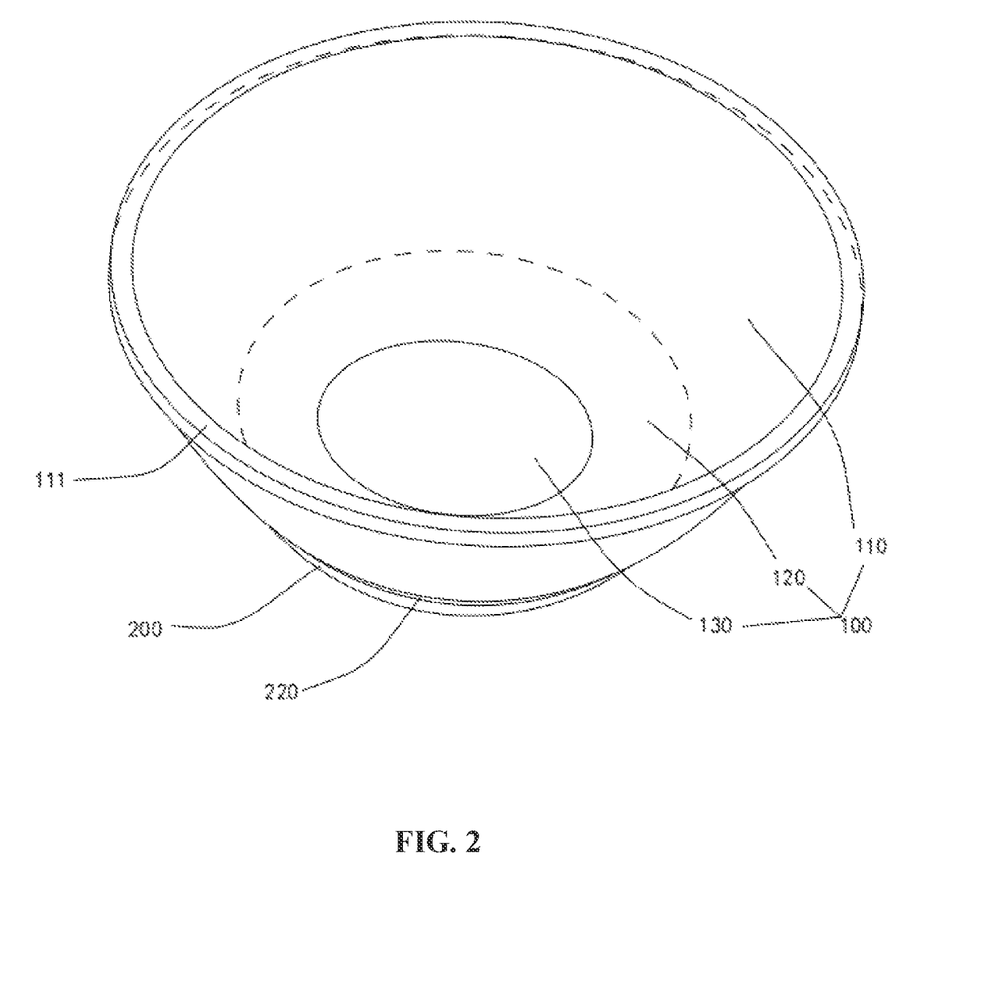
FIG. 2 is a schematic structural diagram of a glass bowl according to an embodiment of the present disclosure.
Figure 3:
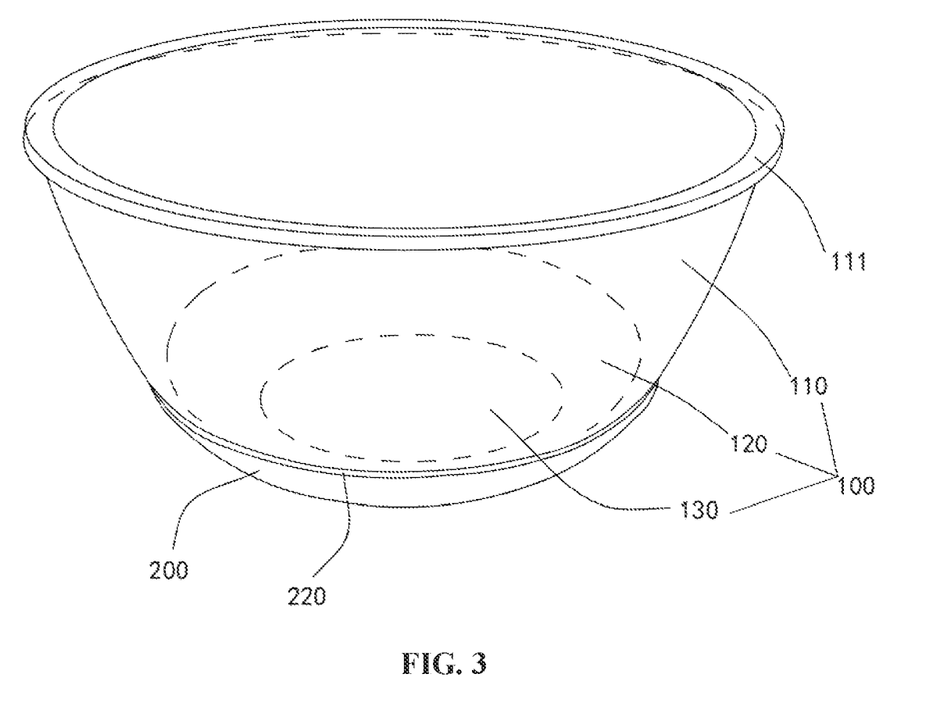
FIG. 3 is a schematic structural diagram of the glass bowl from another perspective according to an embodiment of the present disclosure.

With reference to FIG. 2, in the above method for manufacturing a bowl, the high borosilicate glass bowl includes a side wall portion, an arc portion, and a flat bottom portion which are sequentially connected from top to bottom, and the silica gel coating position includes the flat bottom portion and the arc portion.

By coating the flat bottom portion and the arc portion with silica gel, the high borosilicate glass bowl can be protected in a wide range.

It can be understood that a silica gel coating range of the bottom portion of the high borosilicate glass bowl may be adjusted according to actual needs, which means that a position at the arc portion that is coated by the anti-slip silica gel bottom may be set higher or lower according to actual needs.

In the above method for manufacturing a bowl, the glue is prepared from an alcohol solvent and a silicon compound.

By using the glue, which is formed of the alcohol solvent, the silicon compound and some additives, for adhering silica gel and glass, an adhesive firmness between the silica gel and the high borosilicate glass bowl can be improved.

It can be understood that when the glue is coated on the silica gel coating position of the bottom of the high borosilicate glass bowl, the glue needs to be evenly coated, thus ensuring that the adhesive firmness of each part is consistent.

In the above method for manufacturing a bowl, an upper mold temperature of the molding vulcanizer is 150° C. to 220° C., and a lower mold temperature of the molding vulcanizer is 150° C. to 220° C.; the pressure of the molding vulcanizer is set to be 1 kpa to 15 kpa; and the time of the molding vulcanizer is set to be 30 seconds to 100 seconds.

Temperature, pressure, and time are three key factors in a vulcanization compression molding process, and a silica gel coating effect of the anti-slip silica gel bottom can be improved by setting corresponding parameters according to the above method.

In the above method for manufacturing a bowl, before coating the glue on the bottom of the high borosilicate glass bowl, the method further includes the following step of: applying a sand blasting process on the silica gel coating position of the bottom of the high borosilicate glass bowl.

Applying the sand blasting process on the silica gel coating position of the bottom of the high borosilicate glass bowl first can improve a roughness of the silica gel coating position, so that the silica gel is adhered to the high borosilicate glass bowl more firmly.

In the above method for manufacturing a bowl, the glue is coated on the silica gel coating position of the bottom of the high borosilicate glass bowl by brushing, soaking, or spraying.

With reference to FIG. 2 to FIG. 5, according to an embodiment in a second aspect of the present disclosure, a glass bowl is provided, which includes a glass bowl body 100 made of high borosilicate glass and a silica gel pad 200.

The glass bowl body 100 includes a side wall portion 110, an arc portion 120, and a flat bottom portion 130 which are sequentially connected from top to bottom, and an upper end of the side wall portion 110 is provided with an annular protrusion 111 for bearing a force or anti-sliding.

The silica gel pad 200 is arranged on a bottom portion of the glass bowl body 100, the silica gel pad 200 coats the arc portion 120 and the flat bottom portion 130, and a bottom portion of the silica gel pad 200 is provided with a recess 210.

In the glass bowl according to the embodiment of the present disclosure, the glass bowl body 100 is made of high borosilicate glass, and has characteristics of high hardness, high light transmittance, high chemical stability, cold and hot shock resistance, and the like. The annular protrusion 111 is arranged at the upper end of the side wall portion 110, so that when a user holds or grasps the side wall of the glass bowl body 100 with a hand, force bearing by the glass bowl can be facilitated or the hand can be prevented from slipping relative to the glass bowl body 100. The silica gel pad 200 is arranged at the bottom portion of the glass bowl body 100, which can not only protect the bottom portion of the glass bowl body 100, but also reduce noise when the glass bowl body 100 contacts with the table top, and can also increase the friction between the bottom portion of the glass bowl body 100 and the table top, thus avoiding the glass bowl from sliding easily. By arranging the recess 120 at the bottom portion of the silica gel pad 200, the cost of silica gel material can be saved on one hand, and a function similar to a sucker can be realized on the other hand, so that the glass bowl can be adsorbed on the table top, and the glass bowl is more stable when placed flat on the table top. In addition, when the user needs to use the glass bowl body 100 to stir foods, the user often tilts the glass bowl body 100 to make a bowl opening face the upper right direction, which is convenient for a right hand to extend into the bowl to stir the foods. The silica gel pad 200 coats the arc portion 120 of the glass bowl body 100, so that when the bowl body is tilted, a contact place between the bowl body and the table top is still coated by the silica gel pad 200, thus having functions of protection, shock absorption, and anti-slipping.

Figure 5:
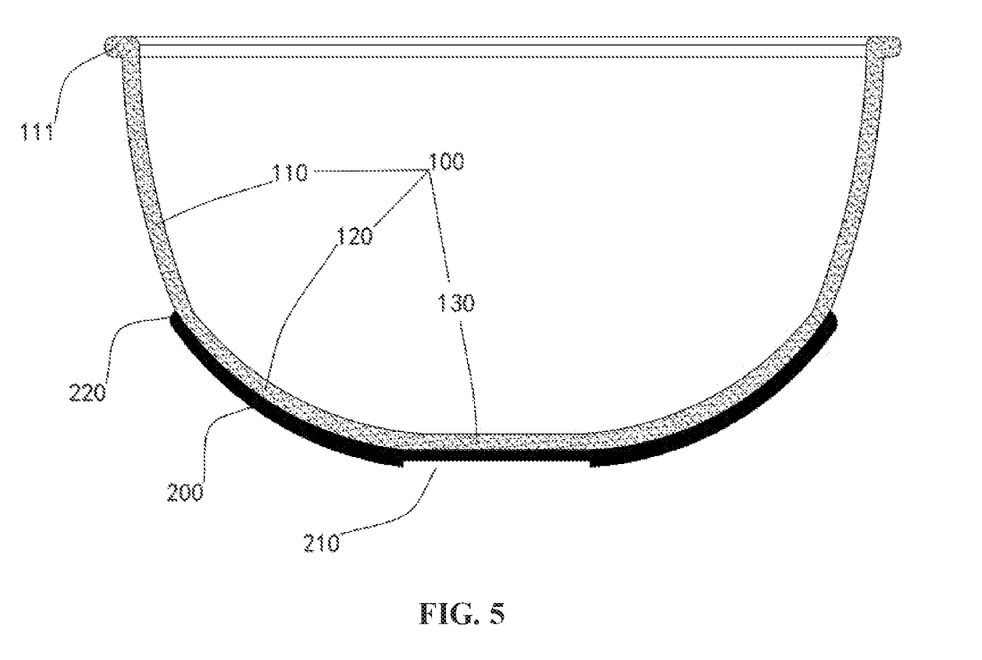
FIG. 5 is a cross-sectional view of the glass bowl according to an embodiment of the present disclosure.

With reference to FIG. 5, in the above glass bowl, a thickness of the annular protrusion 111 is greater than that of the side wall portion 110, and an inner side of the annular protrusion 111 is flush with an inner side of the side wall portion 110.

The thickness of the annular protrusion 111 is greater than that of the side wall portion 110, and the inner side of the annular protrusion 111 is flush with the inner side of the side wall portion 110, so that the annular protrusion 111 protrudes from an outer side of the side wall portion 110. When the user holds the side wall portion 110 of the glass bowl body 100 with a hand, even if the hand is relatively slippery and may slip relative to the side wall portion 110, the hand will abut against the annular protrusion 111 when slipping to a lower end of the annular protrusion 111, so that the hand will not slip further relative to the glass bowl body 100, and the user may not be worried about the glass bowl slipping from the hand. When the user grasps an upper end of the side wall portion 110 of the glass bowl body 100 with a hand, the annular protrusion 111 may be used as a force bearing point of the hand to increase the force bearing capacity of the glass bowl body 100, so that the user can grasp the glass bowl more firmly.

With reference to FIG. 5, in the above glass bowl, a chamfer is arranged at a corner of the annular protrusion 111.

By arranging the chamfer at the corner of the annular protrusion 111, contact between the hand and the annular protrusion 111 can be softer and more comfortable, thus increasing use comfort of the user.

Figure 4:
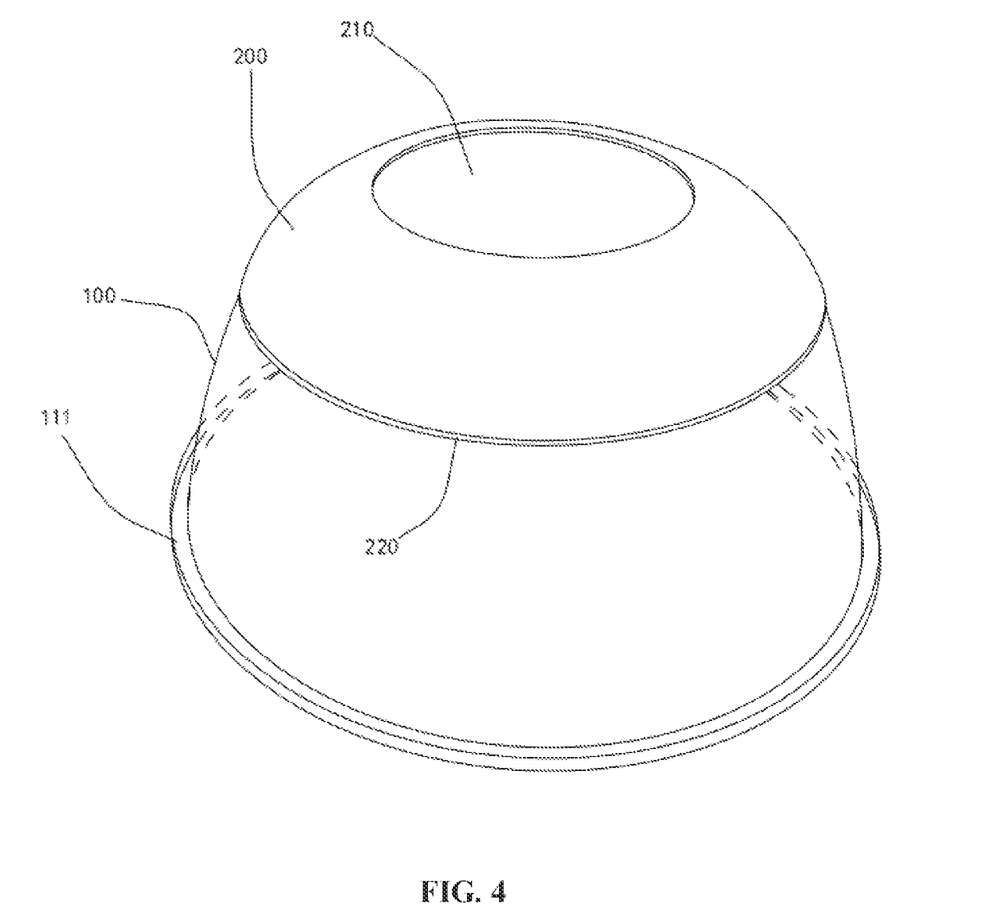
FIG. 4 is a schematic structural diagram of the glass bowl from yet another perspective according to an embodiment of the present disclosure.

With reference to FIG. 4 and FIG. 5, in the above glass bowl, the silica gel pad 200 is adhered to the arc portion 120 and the flat bottom portion 130 through the glue.

The silica gel pad 200 is adhered to the arc portion 120 and the flat bottom portion 130 through the glue, so that the silica gel pad 200 is connected with the glass bowl body 100 more firmly.

With reference to FIG. 4 and FIG. 5, in the above glass bowl, the silica gel pad 200 is adhered to the arc portion 120 and the flat bottom portion 130 by high temperature compression molding.

The high temperature compression molding is beneficial for improving an adhesion between the silica gel pad 200 and the glass bowl body 100, and can also avoid bubbles between the silica gel pad 200 and the glass bowl body 100, which affect a product quality.

With reference to FIG. 5, in the above glass bowl, the side wall portion 110 is gradually narrowed from top to bottom.

With reference to FIG. 4, in the above glass bowl, the recess 210 is a circular recess, and a position of the circular recess corresponds to a position of the flat bottom portion 130.

It can be understood that the recess 210 may also have other shapes, for example, the recess 210 may be an elliptical recess or a polygonal recess.

With reference to FIG. 5, in the above glass bowl, the silica gel pad 200 is provided with an arc transition surface 220 at an edge of the silica gel pad 200.

By providing the arc transition surface 220 at the edge of the silica gel pad 200, a smooth transition between the edge of the silica gel pad 200 and the glass bowl body 100 can be achieved.

With reference to FIG. 5, in the above glass bowl, a depth of the recess 210 is between 20% and 80% of the thickness of the silica gel pad 200.

By setting the depth of the recess 210 within the above range, it can not only ensure an adsorption effect of the glass bowl on the table top, but also ensure a buffering effect of the silica gel pad 200.

The embodiments of the present disclosure are described in detail with reference to the accompanying drawings above, but the present disclosure is not limited to the above embodiments, and various changes may also be made within the knowledge scope of those of ordinary skill in the art without departing from the purpose of the present disclosure.

What is claimed is:

1. A method for manufacturing a bowl, comprising:
   manufacturing a high borosilicate glass bowl with high borosilicate glass;
   measuring a radian and surface of a silica gel coating position of a bottom of the high borosilicate glass bowl by a laser scanner;
   manufacturing a molding die according to the measured radian;
   coating glue for adhering silica gel on the silica gel coating position of the bottom of the high borosilicate glass bowl, wherein the glue is prepared from an alcohol solvent and a silicon compound;
   putting a solid rubber compound into a mixing mill to be mixed evenly, and then adding a vulcanizing agent and a silica gel masterbatch to obtain a silicone rubber raw material;
   loading the molding die into a molding vulcanizer, and setting a mold temperature, a pressure, and a time;
   weighing the silicone rubber raw material according to a preset weight, and putting the silicone rubber raw material with the preset weight on the silica gel coating position of the bottom of the high borosilicate glass bowl; and putting the high borosilicate glass bowl and the silicone rubber raw material into the molding die in the molding vulcanizer, and performing, by the molding vulcanizer, vulcanization molding on the silicone rubber raw material to obtain a high borosilicate glass bowl with an anti-slip silica gel bottom.

2. The method for manufacturing a bowl of claim 1, wherein the high borosilicate glass bowl comprises a side wall portion, an arc portion, and a flat bottom portion which are sequentially connected from top to bottom, and the silica gel coating position comprises the flat bottom portion and the arc portion.

3. The method for manufacturing the bowl of claim 1, wherein an upper mold temperature of the molding vulcanizer is 150° C. to 220° C., and a lower mold temperature of the molding vulcanizer is 150° C. to 220° C.; the pressure of the molding vulcanizer is set to be 1 kpa to 15 kpa; and the time of the molding vulcanizer is set to be 30 seconds to 100 seconds.

4. The method for manufacturing a bowl of claim 1, wherein before coating the glue on the bottom of the high borosilicate glass bowl, the method further comprises:

applying a sand blasting process on the silica gel coating position of the bottom of the high borosilicate glass bowl.

5. The method for manufacturing a bowl of claim 1, wherein the glue is coated on the silica gel coating position of the bottom of the high borosilicate glass bowl by brushing, soaking, or spraying.

* * * * *